US011152887B2

(12) United States Patent
Kimura et al.

(10) Patent No.: US 11,152,887 B2
(45) Date of Patent: Oct. 19, 2021

(54) POWER CONVERSION DEVICE, MOTOR CONTROL SYSTEM, AND DIAGNOSIS METHOD FOR POWER CONVERSION DEVICE

(71) Applicant: Hitachi, Ltd., Tokyo (JP)

(72) Inventors: Yoshinobu Kimura, Tokyo (JP); Kazuki Tani, Tokyo (JP); Takashi Ogawa, Tokyo (JP); Hiroshi Suzuki, Tokyo (JP); Junichi Sakano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 28 days.

(21) Appl. No.: 16/629,328

(22) PCT Filed: Mar. 5, 2018

(86) PCT No.: PCT/JP2018/008367
§ 371 (c)(1),
(2) Date: Jan. 8, 2020

(87) PCT Pub. No.: WO2019/049399
PCT Pub. Date: Mar. 14, 2019

(65) Prior Publication Data
US 2021/0021227 A1     Jan. 21, 2021

(30) Foreign Application Priority Data
Sep. 6, 2017     (JP) .............................. JP2017-171303

(51) Int. Cl.
*H02P 29/68*      (2016.01)
*H02P 27/08*      (2006.01)

(52) U.S. Cl.
CPC .............. *H02P 29/68* (2016.02); *H02P 27/08* (2013.01)

(58) Field of Classification Search
CPC .......... H02P 29/68; H02P 27/08; H02P 27/04; H02P 27/06; H02P 1/00; H02P 1/04;
(Continued)

(56) References Cited

U.S. PATENT DOCUMENTS

| 4,870,564 A * | 9/1989 | Ketelhut | G05B 19/054 710/12 |
| 6,268,986 B1 * | 7/2001 | Kobayashi | H02P 29/68 361/24 |

(Continued)

FOREIGN PATENT DOCUMENTS

| JP | 2013-142704 A | 7/2013 |
| JP | 2016-63667 A | 4/2016 |

(Continued)

OTHER PUBLICATIONS

International Search Report of PCT/JP2018/008367 dated May 15, 2018.

*Primary Examiner* — Antony M Paul
(74) *Attorney, Agent, or Firm* — Mattingly & Malur, PC (57) ABSTRACT

A temperature abnormality of the power module is accurately detected. A power conversion device including a power semiconductor module with a switching element, includes: a gate driver circuit configured to drive a switching element and transmitting a response signal upon a switching operation of the switching element; a control unit device configured to output to a gate driver circuit an instruction signal for switching; a temperature detection unit configured to calculate a bonding temperature of the switching element based on a response signal to the instruction signal; and a calculation unit configured to determine a state of a power semiconductor module according to a bonding temperature calculated by the temperature detection unit and the response signal.

7 Claims, 10 Drawing Sheets

(58) Field of Classification Search
CPC .... H02P 1/46; H02P 3/00; H02P 41/00; H02P 21/00; H02P 23/00; H02P 27/00; G01K 7/346; G01K 17/00; G01P 5/10; G01P 13/006; G05B 11/28
See application file for complete search history.

(56) References Cited

U.S. PATENT DOCUMENTS

| | | | | |
|---|---|---|---|---|
| 7,826,985 B2* | 11/2010 | Weiss | ............... | H02P 29/02 |
| | | | | 702/42 |
| 8,363,440 B2* | 1/2013 | Tagome | ............... | H02M 1/28 |
| | | | | 363/131 |
| 8,717,069 B2* | 5/2014 | Curbelo | ............... | H03K 17/163 |
| | | | | 327/108 |
| 8,829,839 B1* | 9/2014 | Vrankovic | ............ | H02K 11/0094 |
| | | | | 318/472 |
| 8,957,723 B2* | 2/2015 | Zoels | ............... | H03K 17/18 |
| | | | | 327/378 |
| 9,030,054 B2* | 5/2015 | Jacobson | ............ | H03K 17/127 |
| | | | | 307/115 |
| 9,985,570 B2* | 5/2018 | Endoh | ............... | H02P 21/22 |
| 10,069,439 B2* | 9/2018 | Yokoi | ............... | H02M 7/538 |
| 10,263,412 B2* | 4/2019 | Huber | ............... | G01R 19/165 |
| 10,393,795 B2* | 8/2019 | Aeloiza | ............ | H03K 17/687 |
| 10,868,529 B2* | 12/2020 | Norling | ............ | H03K 17/0828 |
| 2013/0177041 A1 | 7/2013 | Sundaramoorthy et al. | | |
| 2017/0282720 A1 | 10/2017 | Sakano et al. | | |
| 2018/0123477 A1 | 5/2018 | Sakano et al. | | |

FOREIGN PATENT DOCUMENTS

| | | |
|---|---|---|
| JP | 2016-220481 A | 12/2016 |
| WO | 2016/207954 A1 | 12/2016 |

\* cited by examiner

POWER CONVERSION DEVICE, MOTOR CONTROL SYSTEM, AND DIAGNOSIS METHOD FOR POWER CONVERSION DEVICE

TECHNICAL FIELD

The present invention relates to a power conversion device, particularly, to one for control of a motor destined for a railway vehicle or large-scale industry, and to a maintenance or diagnosis technique for a power conversion device configured with a power semiconductor switch element.

BACKGROUND ART

In a control application of a motor destined for a railway vehicle or large-scale industry, or in a power conversion device such as a large-capacity frequency conversion device for a power system and the like, high-voltage and large-current power control is performed using a large-capacity power module. In such equipment, if a failure occurs during operation, damage to the system or unplanned system shutdown may occur, resulting in a large economic loss. In order to prevent such a situation, it is necessary to detect a deterioration or abnormality of the power conversion device, to prevent breakdown due to function stop, to notify relevant parties of a need of maintenance such as parts replacement, and to perform life extension control of the power conversion device.

In the large-capacity power module, small-capacity semiconductor chips (transistors and diodes) are connected in parallel, and each of the semiconductor chips is designed to perform a switching operation evenly.

However, when element parameters of even one of the semiconductor chips in the power module exceed an allowable variation range during operation of the power conversion device, a switching timing thereof is different from switching timing of other chips, and an unbalance occurs such that a current flowing through the elements is concentrated and difficult to flow. As a result, the entire power module may overheat and be destroyed.

For this reason, although there is a method of implementing a temperature sensor such as a thermistor on each of the semiconductor chips respectively, there is a problem of an increased cost and a reliability of the temperature sensor. Here, it is known to directly detect an abnormality in the temperature of one of the semiconductor chips (bonding temperature). As an example, PTL 1 is provided. In this example, since a start and end phase time delay of a mirror plateau phase of characteristics of a gate-emitter voltage during a switch-off phase of switch-off phase of an insulated gate bipolar transistor (IGBT) element is detected, a method for determining a bonding portion temperature of the IGBT element is disclosed.

CITATION LIST

Patent Literature

PTL 1: JP-A-2013-142704

SUMMARY OF INVENTION

Technical Problem

As described above, during a stable operation of the power conversion device, a temperature of the semiconductor chips in the power module, which are heat sources, and monitoring of a cooling system are important.

However, during operation of the power conversion device, the power module has a heat distribution of the respective chips, and thermal histories thereof differ depending on positions of the chips. As a result, a variation in a long-term reliability of the chips is larger than a variation in an initial characteristic, so that a temperature abnormality of each of the chips in the module must be accurately detected. With respect to this, in a module composed of parallel chips, when the method of PTL 1 is used, an average temperature of the parallel chips is indicated as a result, so that the temperature abnormality of the power module cannot be accurately detected. In addition, if a temperature sensor is mounted on each chip, the cost of the power module increases, and if the reliability of the temperature sensor is low, the detection accuracy also decreases.

An object of the invention is to provide a power conversion device, a motor control system, and a diagnosis method for a power conversion device that are capable of accurately detecting temperature abnormality of a power module.

Solution to Problem

A power conversion device according to the invention is a power conversion device including a power semiconductor module including a switching element, in which the power conversion device includes: a gate driver circuit configured to drive the switching element and transmit a response signal upon a switching operation of the switching element; a control unit device configured to output to the gate driver circuit an instruction signal for switching; a temperature detection unit configured to calculate a bonding temperature of the switching element based on the response signal to the instruction signal; and a calculation unit configured to determine a state of the power semiconductor module according to the bonding temperature calculated by the temperature detection unit and the response signal.

In addition, the invention is also grasped as a motor control system including the power conversion device and a diagnosis method for a power conversion device.

Advantageous Effect

According to the invention, it is possible to accurately detect temperature abnormality of a power module.

DESCRIPTION OF EMBODIMENTS

Hereinafter, the present embodiment will be described in detail with reference to the drawings.

<1. Overall Configuration of System>

Figure 1:
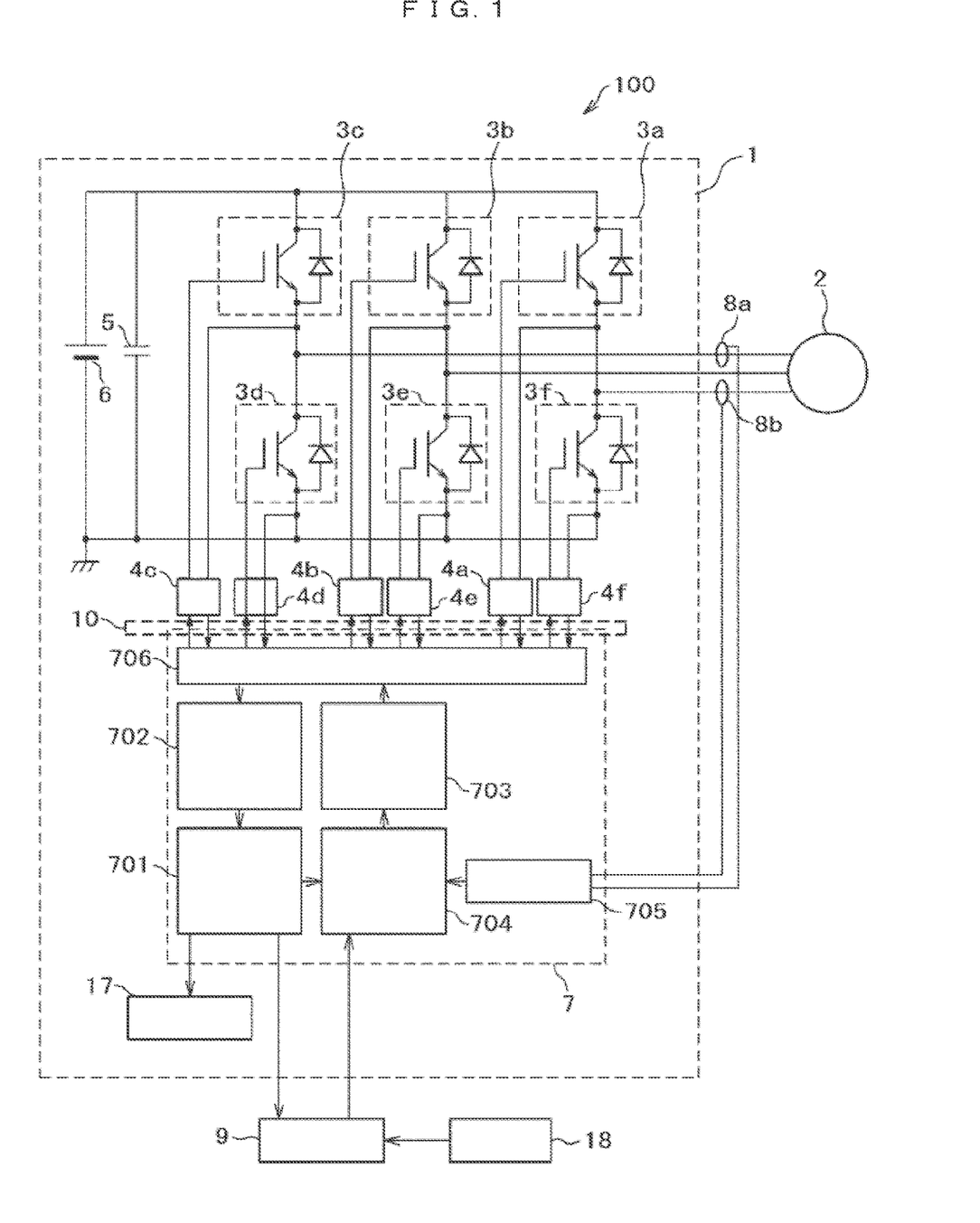
FIG. 1 is a block diagram indicating an embodiment of a power conversion device.

A diagnosis system 100 according to the present embodiment will be described with reference to FIGS. 1, 2, and 11. FIG. 1 is an overall block diagram of the system in the present embodiment. In FIG. 1, the system is mainly configured with a power conversion device 1, a three-phase motor 2 driven by the power conversion device 1 as a load, and a graphical user interface (GUI) 9 that monitors a state of the power conversion device 1 and the motor 2. The power conversion device 1 includes a control device 7. Between the power conversion device 1 and the motor 2, current sensors 8a and 8b that measure a phase current supplied to the motor 2 are provided. The GUI 9 is, for example, a display device configured integrally with or separately from the control device 7 and configured with a liquid crystal display (LCD) or the like.

Figure 3:
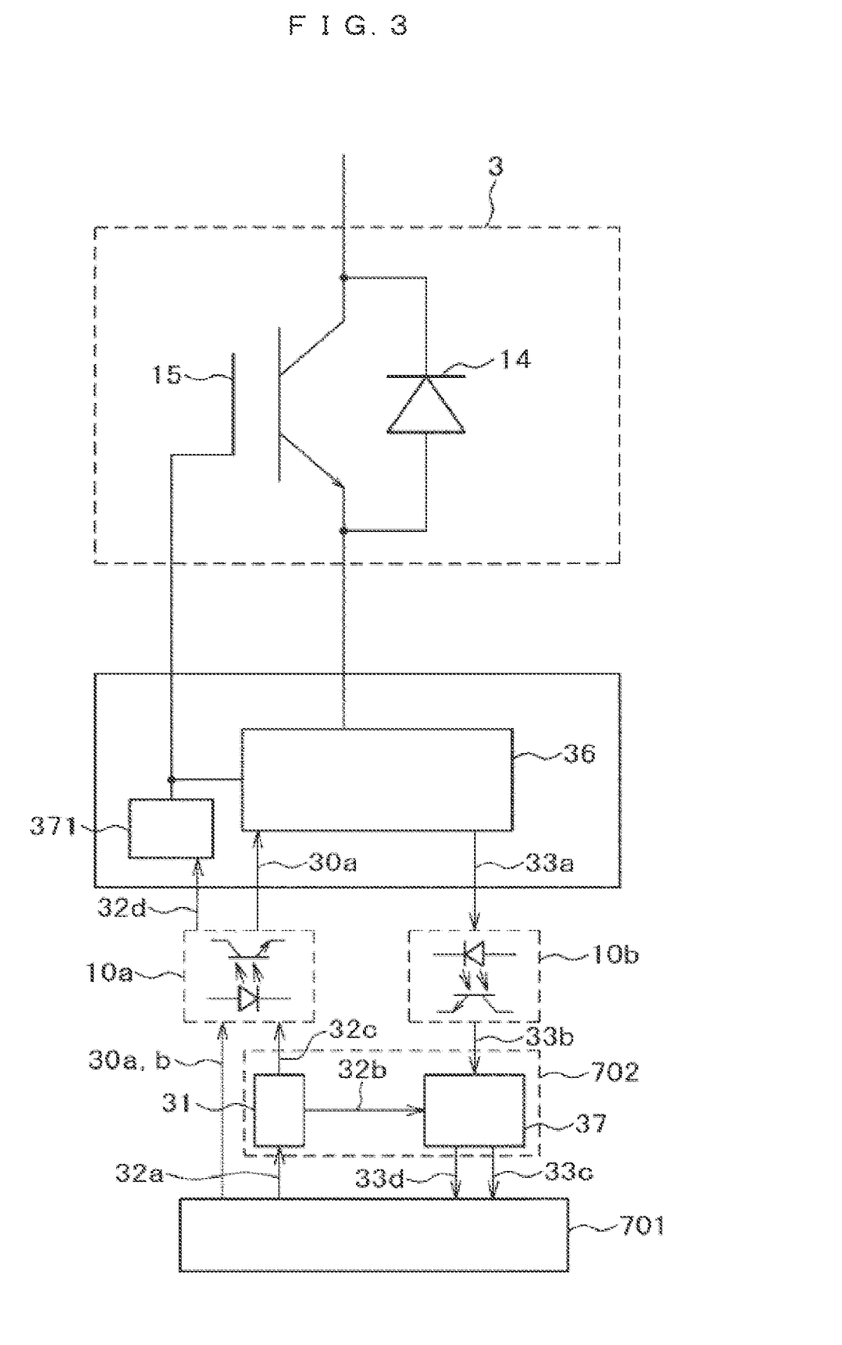
FIG. 3 is a block diagram indicating an embodiment for obtaining an instruction signal and a response signal of FIG. 1.

The power conversion device 1 is a device that controls the motor 2 by converting a direct current 6 into a three-phase alternating current. The power conversion device 1 includes a smoothing capacitor 5, a plurality of power modules 3a to 3f, gate driver circuits 4a to 4f, and a control device 7. The control device 7 includes a parameter calculation unit 701, a temperature detection unit 702, a control unit 703, a logic unit 704, a current detection unit 705, and an instruction response transmission and reception unit 706. In addition, the temperature detection unit 702 includes a signal branching device 31 and a time measuring unit 37 (FIG. 3). The gate driver circuits 4a to 4f and the control device 7 are insulated by an insulating element 10 (an optical coupling element, a magnetic coupling element, an electrostatic coupling element, or the like). In FIG. 1, the gate driver circuits 4a to 4f are disposed outside of power modules 3a to 3f, whereas the gate driver circuits 4a to 4f may also be incorporated in the power modules 3a to 3f. These specific operations will be described later.

The power modules 3a to 3f are power semiconductor modules each of which has a switching element in which a transistor, for example, an insulated gate bipolar transistor (IGBT), a metal oxide semiconductor field effect transistors (MOSFET), and the like, and a diode (such as a PN diode and a Schottky barrier diode) are connected in anti-parallel. In order to control a large current, as shown in FIG. 2, in each of the power modules 3a to 3f (hereinafter simply referred to as power modules 3), a plurality of small-capacity semiconductor chips (16a, 16b, 16c) are connected in parallel. Each of the power modules 3 is provided with an emitter terminal, a collector terminal, and a gate terminal. In this embodiment, an IGBT is used in the power modules 3, whereas when a MOSFET is used, the emitter terminal may be replaced with a source terminal and the collector terminal may be replaced with a drain terminal.

Figure 2:
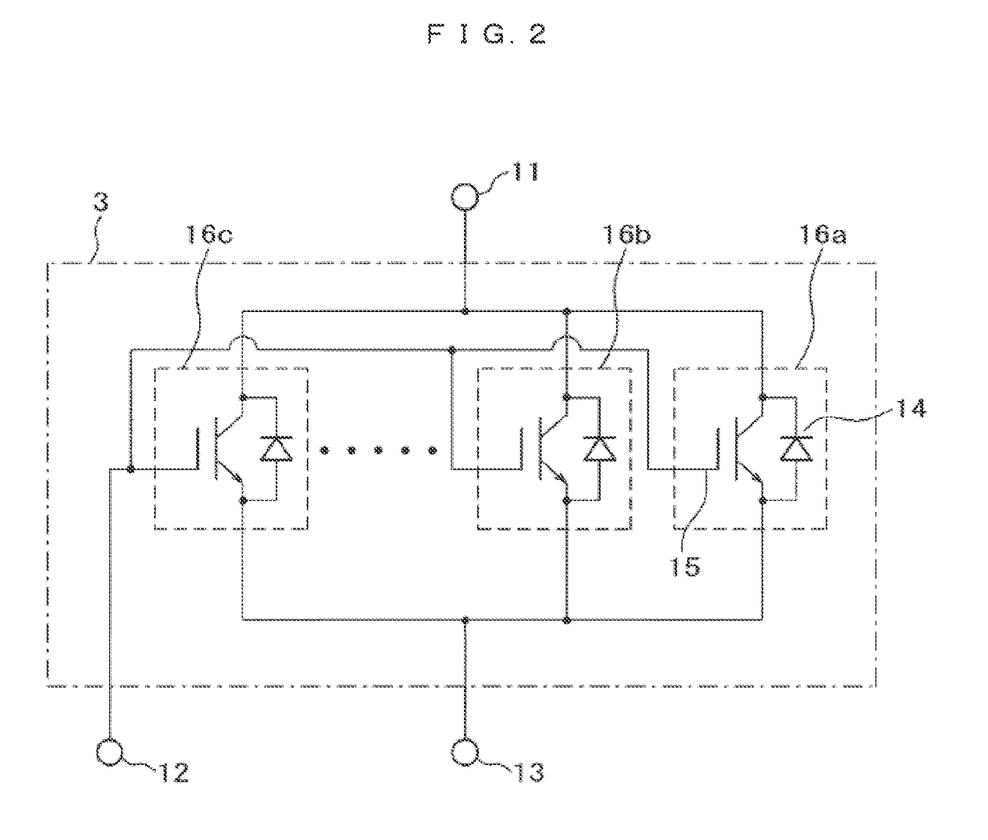
FIG. 2 is a block diagram indicating a power module composed of parallel chips of FIG. 1.

FIG. 2 shows a specific example of the power modules 3. In order to control a large current, each of the power modules 3 has a large capacity, and includes the plurality of small capacity semiconductor chips 16a to 16c connected in parallel. In the semiconductor chip 16a, a transistor 15 and a diode 14 are manufactured in anti-parallel on the same semiconductor chip, whereas the transistor 15 and the diode 14 also may be manufactured on separate semiconductor chips and connected in anti-parallel. Each of the power modules 3 is provided with a collector terminal 11, a gate terminal 12, and an emitter terminal 13.

FIG. 3 shows a specific example in which an instruction signal and a response signal are generated by the system shown in FIG. 1 and a delay time is acquired. The parameter calculation unit 701 outputs a generated PWM instruction signal 32a to the temperature detection unit 702 via the instruction response transmission and reception unit 706, and set a first drive voltage set value 30a and a second drive voltage set value 30b as reference voltages for a comparator 36 via an insulating coupling element 10a. As will be described later, the first drive voltage set value 30a is set to a value smaller than the second drive voltage set value 30b. The temperature detection unit 702 branches the PWM instruction signal 32a generated by the parameter calculation unit 701 into a start instruction signal 32b and a stop instruction signal 32c with the signal branching device 31. The stop instruction signal 32c drives a gate driver circuit 371 with a stop instruction signal 32d that is obtained via the insulating coupling element 10a.

The comparator 36 is configured with a comparator circuit using an operational amplifier, connected to a gate and an emitter of the power module 3, and generates a response signal 33a with respect to the stop instruction signal 32d as a reference voltage based on the first drive voltage set value 30a and the second drive voltage set value 30b. The response signal 33a is transmitted to the time measuring unit 37 of the temperature detection unit 702 as a response signal 33b via an insulating coupling element 10b. The time measuring unit 37 measures a time difference between the start instruction signal 32b output from the signal branching device 31 and the response signal 33b, and sends the time difference to the parameter calculation unit 701 as a response signal 33c. The time measuring unit 37 is configured with, for example, a circuit using a time/digital converter. The response signal 33d is transmitted to the parameter calculation unit 701 as a branch signal of the response signal 33b. In the present embodiment, since a time measurement is performed under a low voltage by the insulating coupling element 10a, an influence of noise can be reduced.

Figure 4:
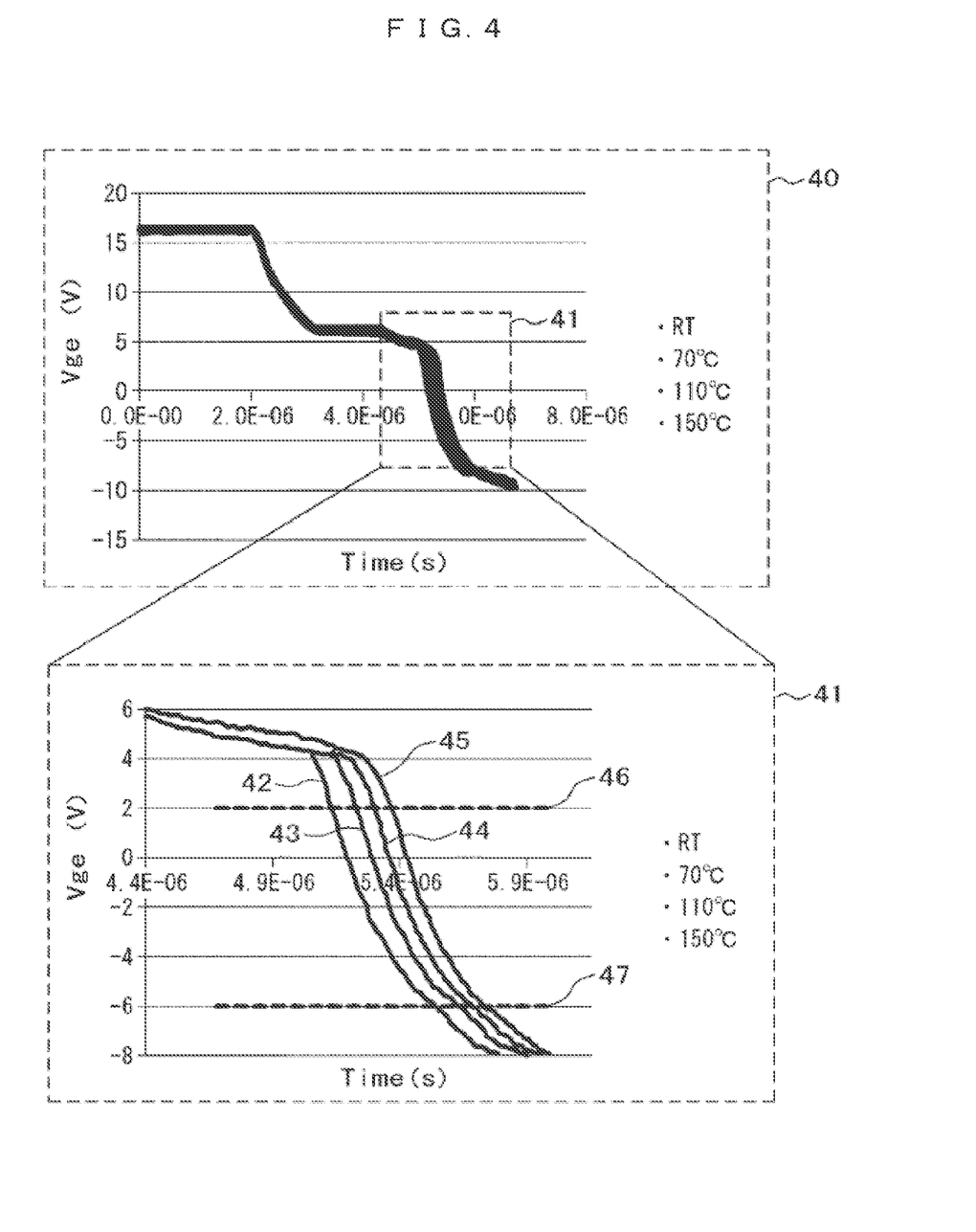
FIG. 4 is a diagram indicating a gate voltage waveform and a set value upon turn-off when an average temperature changes in the embodiment.
Figure 7:
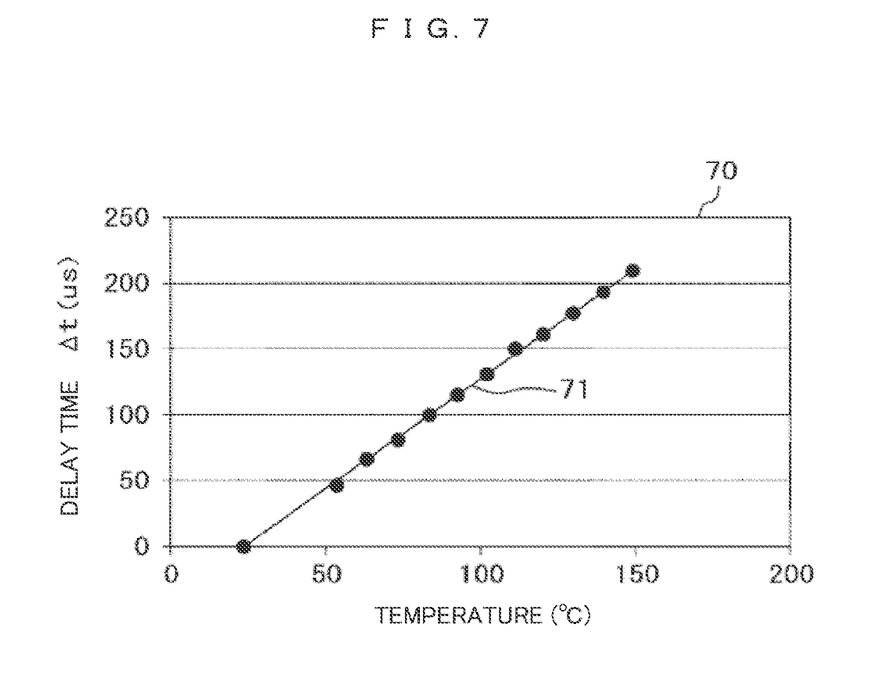
FIG. 7 is a diagram indicating temperature dependency of a plurality of delay times of a first response signal in the embodiment.

An example of the first drive voltage set value 30a and the second drive voltage set value 30b will be described with reference to FIG. 4. The first drive voltage set value 30a and the second drive voltage set value 30b shown below are based on discoveries of inventors. As shown in an upper part of FIG. 4, a gate voltage waveform 40 upon turn-off is delayed in the region 41 as a temperature of the power module 3 rises. For example, a waveform 42 at a room temperature, a waveform 43 at 70° C., a waveform 44 at 110° C., and a waveform 45 at 150° C. are shown in an enlarged view of a lower part of FIG. 4. In the present embodiment, the first drive voltage set value 30a is shown as a first threshold value 47, and the second drive voltage set value 30b is shown as a second threshold value 46. If temperatures of the power modules 3 are uniform (if a temperature unbalance among the power modules 3 is extremely small), waveform delay amounts at the first drive voltage set value 30a and the second drive voltage set value 30b are proportional to the temperatures of the power modules. For example, as shown in a graph indicating a temperature dependency of the waveform delay amount shown in FIG. 7, the waveform delay amount increases as the temperatures of the power modules rise. Accordingly, it can be seen that a delay amount of the waveform 45 is the largest among the waveforms shown in FIG. 4.

Figure 5:
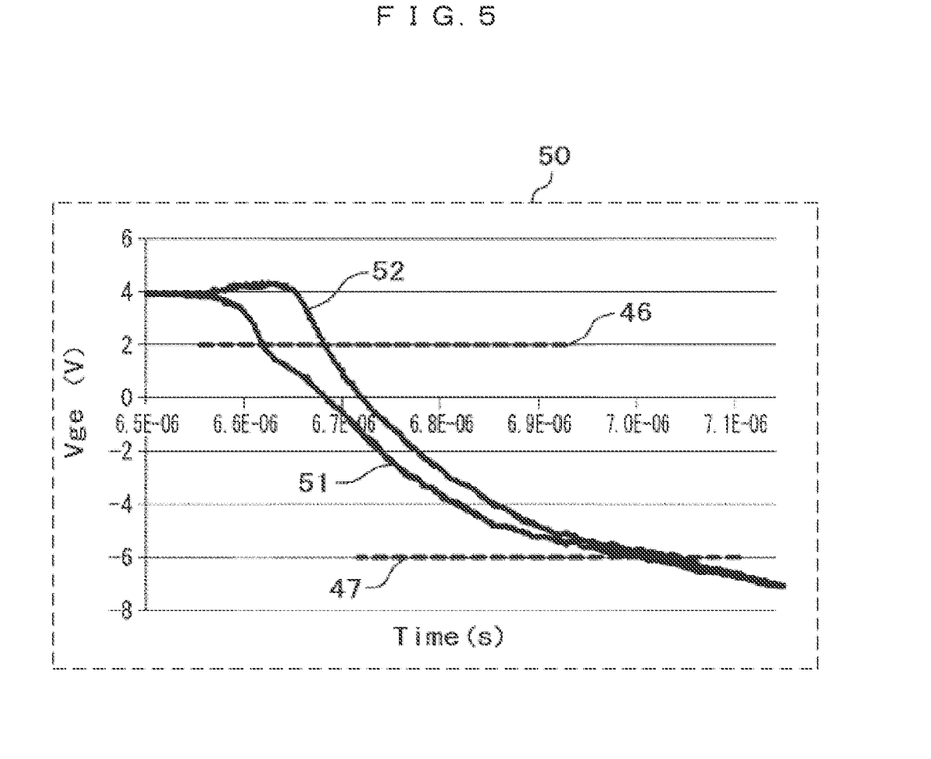
FIG. 5 is a diagram indicating a gate voltage waveform and a set value upon turn-off when each of the average temperatures is the same and when a temperature unbalance occurs in the embodiment.

FIG. 5 shows a waveform 51 in which the temperatures of power modules 3 are uniform and a waveform 52 in which unbalance occurs by ±30° C. Both the waveform 51 and the waveform 52 have an average temperature of 70° C. At the first threshold value 47 indicating the first drive voltage set value 30a, there is no difference in delay amounts between the waveform 51 and the waveform 52. On the other hand, at the second threshold value 46 indicating the second driving voltage pressure set value 30b, since a temperature unbalance occurs, a delay time of the waveform 51 is smaller than a delay time of the waveform 52. Accordingly, it has been found that the second threshold value 47 indicates the average temperature of the power modules, and the delay time at the first threshold value 46 indicates the unbalance.

Figure 6:
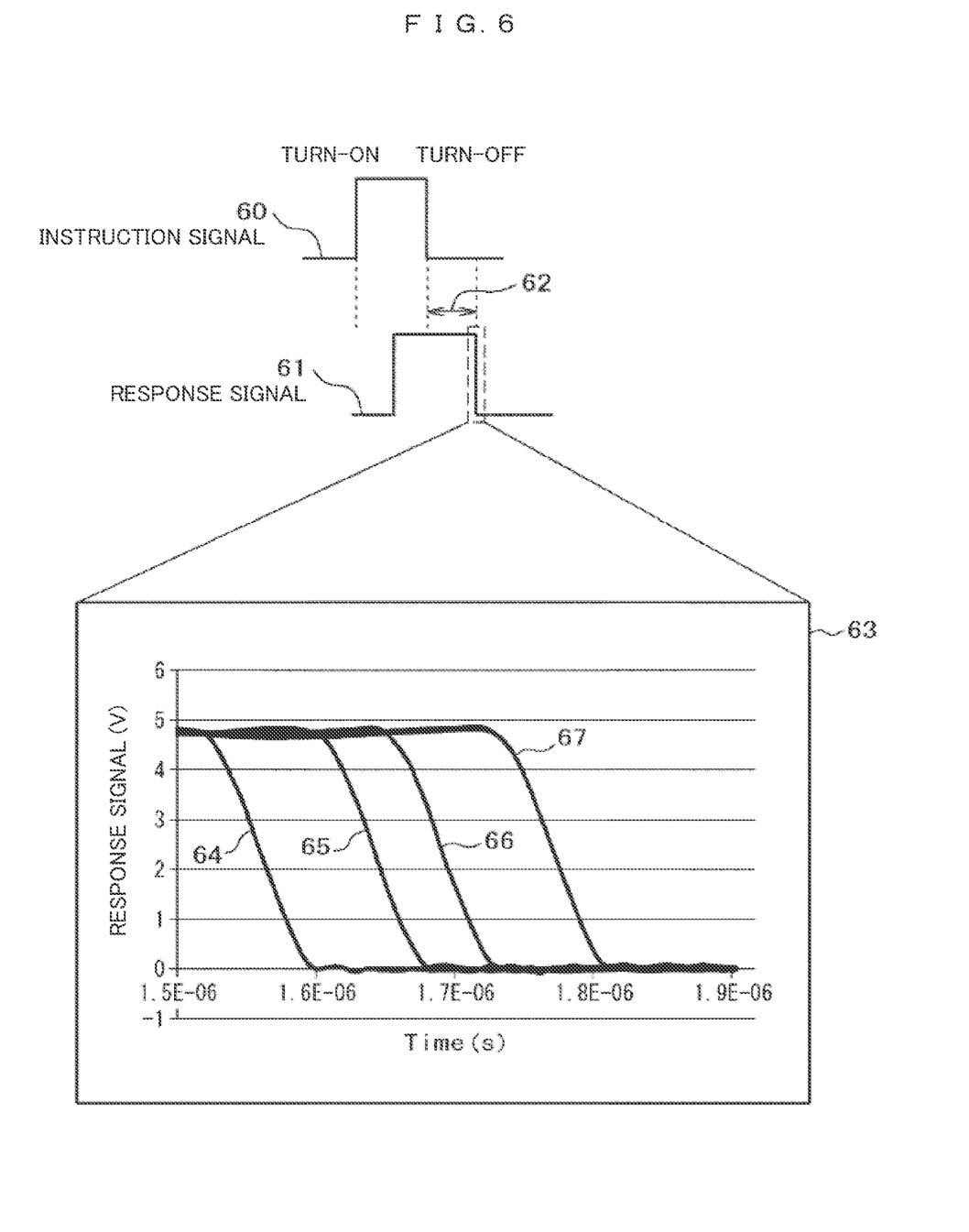
FIG. 6 is a diagram explaining the instruction signal and the response signal in an example.

An example of an instruction signal and a response signal is shown in FIG. 6. An instruction signal 60 is a part of the PWM instruction signal 32a and a response signal 61 is a part of the response signal 33b generated by the comparator 36. The time measuring unit 37 measures a delay time 62. A waveform 63 shows a power module temperature dependency of the response signal upon turn-off. The waveforms shown in FIG. 6 are waveforms of the response signal generated at a set voltage indicated by the first drive voltage set value 30a, and correspond to the gate waveforms of FIG. 4. That is, the waveform 64 corresponds to the waveform 42 at the room temperature, the waveform 65 corresponds to the waveform 43 at 70° C., the waveform 66 corresponds to the waveform 44 at 110° C., and the waveform 67 corresponds to the waveform 45 at 150° C. The delay time uses, for example, a value of the response signal at 2.5 V. The temperature detection unit 702 calculates the temperature based on the delay time with reference to calibration data or a regression model acquired in advance. The temperature detection unit 702 calculates the signal delay amount and bonding temperature based on the instruction signal and the response signal, and sends a signal to the control unit 703 and the parameter calculation unit 701.

In this way, according to the present embodiment, it is possible to provide a system that acquires the bonding temperature and the temperature unbalance of the power semiconductor elements in the power conversion device 1, performs life extension processing of the power module by feedbacking a measurement result to a motor control, and warns of parts replacement can be provided.

Subsequently, a method for estimating a damage degree and a remaining life of the power module 3 will be described. The parameter calculation unit 701 estimates the damage degree and the remaining life of the power module 3 via calculation using the PWM instruction signal and time series data of the bonding temperature obtained from the temperature detection unit 702. The time series data is the past PWM instruction signals and the bonding temperatures obtained from the temperature detection unit 702, and is accumulated in a memory chip included in the parameter calculation unit 701.

Figure 8:
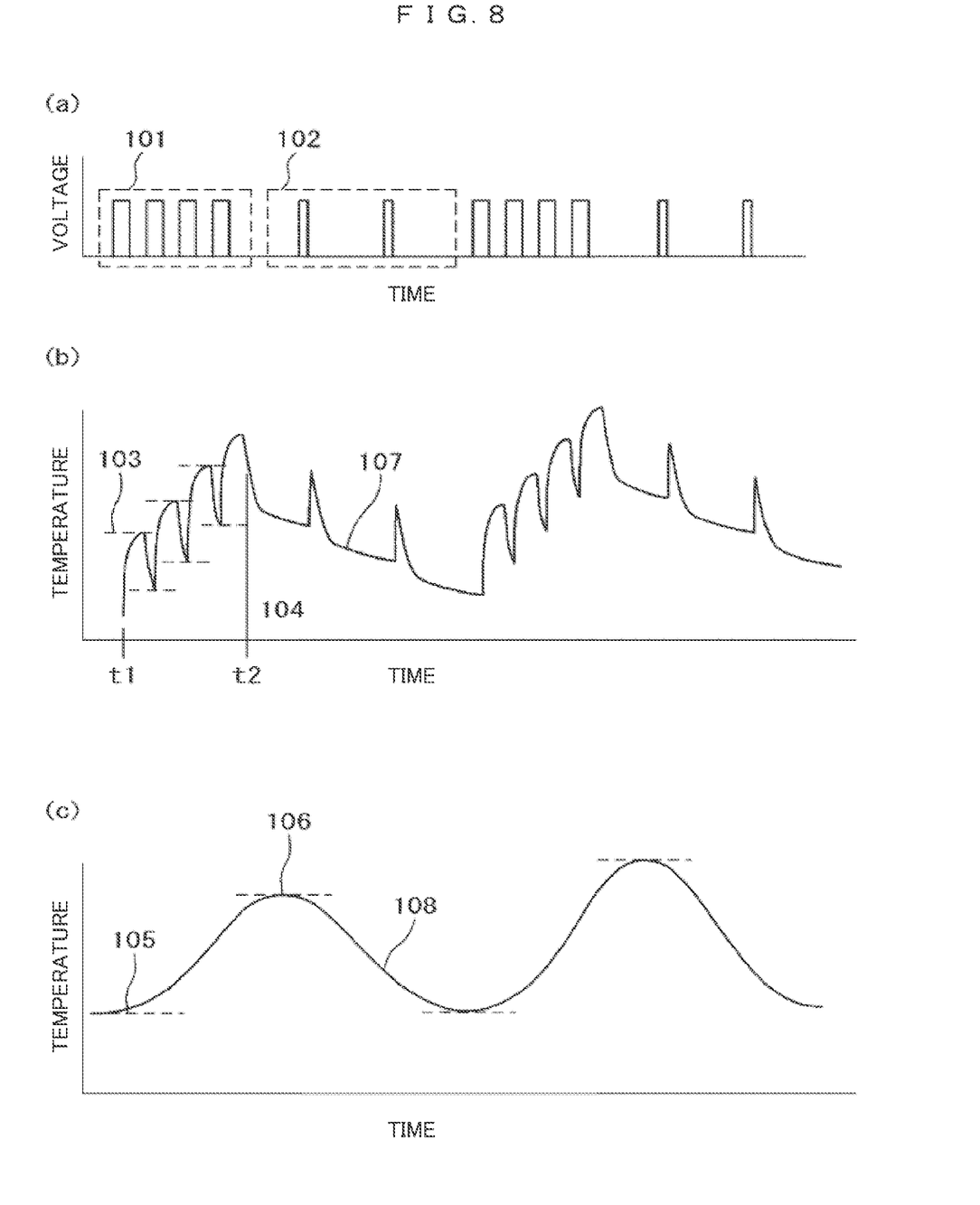
FIG. 8 is a diagram indicating time series data of element temperatures in the embodiment.

FIG. 8 is a diagram indicating time series data in the present embodiment. FIG. 8(*a*) is a diagram indicating a PWM instruction signal. FIG. 8(*b*) is a diagram indicating the temperature of the chips (bonding temperature). FIG. 8(*c*) is a diagram indicating a change of a temperature of a cooler 38 (FIG. 11). Since a cooling capacity may be insufficient depending on an operating environment, the cooler 38 mounted on the power conversion device 1 is monitored and controlled.

In FIG. 8(*a*), PWM instruction signals 101 have a large duty ratio, and PWM instruction signals 102 have a small duty ratio. In response to these PWM instruction signals, the bonding temperature changes in a vibrational manner as shown in FIG. 8(*b*), for example, such that a time series data 107 of the bonding temperature has a maximum value 103 and a minimum value 104. In the PWM instruction signals 101 having a large duty ratio, the bonding temperature tends to increase, and in the PWM instruction signals 102 having a small duty ratio, the bonding temperature tends to decrease. In addition, as shown in FIG. 8(*c*), when the bonding temperature changes as shown in FIG. 8(*b*), according to the change, a time series data 108 of the temperature of the cooler 38 gradually changes with a slight delay. For example, when the bonding temperature from time t1 to time t2 tends to increase, the temperatures of the cooler 38 reaches a maximum value 106 at a subsequent timing. In addition, a minimum value 105 is taken at a timing when the bonding temperature changes from a downward tendency to an upward tendency.

One of focus points of the present embodiment is to detect an unbalance of damages among the plurality of power modules 3 in the power conversion device 1 to prevent a system failure in advance. Accordingly, the parameter calculation unit 701 obtains a frequency distribution of thermal cycles of the bonding temperature among the thermal cycles of the bonding temperature shown in FIG. 8(*b*). For example, a rainflow algorithm may be used as a method for converting the thermal cycles into frequencies.

Figure 9:
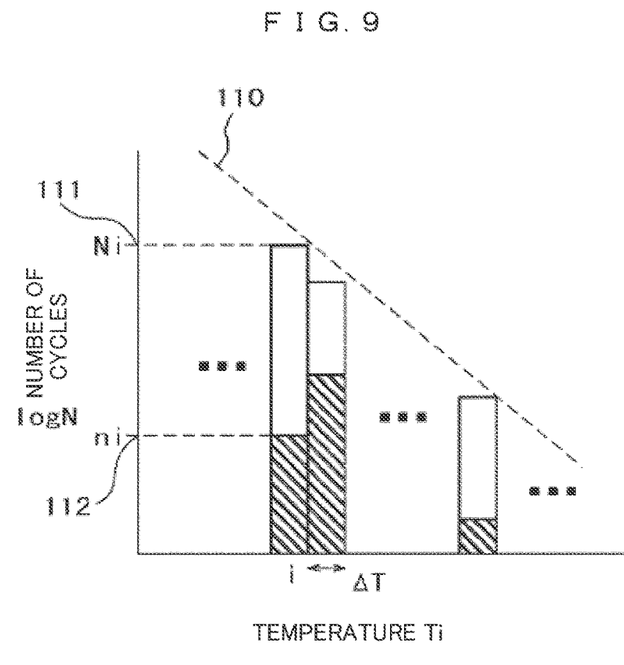
FIG. 9 is a diagram indicating temperature amplitude frequency data in which the time series data of element temperatures is converted into a histogram in the embodiment.

FIG. 9 shows an example of a temperature amplitude frequency in which the time series data of the bonding temperature is converted into a histogram. A temperature amplitude $\Delta T$ on the horizontal axis is set, for example, in increments of 5° C. from the GUI 9. The vertical axis is a logarithmic display with a number of cycles. A heat cycle related value 110 uses a power cycle test result provided when the power module is shipped. Ni is a maximum number of cycles at a temperature Ti, and ni is a number of cycles obtained by the parameter data calculation unit 701 at the temperature Ti.

For example, as shown in the time series data 107 of the bonding temperatures in FIG. 8(*b*), the number of cycles between predetermined times t1 and t2 at the temperature amplitude $\Delta T$ is 4. The parameter calculation unit 701 adds a logarithm of the number of cycles obtained in this way as a frequency at the temperature amplitude $\Delta T$. Since the number of heat cycles corresponding to an original temperature upon shipment is the heat cycle related value 110, a damage degree Di of each of the temperatures Ti is given by Di=ni/Ni. Accordingly, a total damage degree is D=$\Sigma$Di, which is a sum of the damage degrees at each given temperature. In this method, the damage degree has a tendency of being larger than the damage degree in a method of the related art, but the accuracy of unbalance detection of the power modules is improved. The parameter calculation unit 701 can display a damaged module on a power conversion device display unit 17 or the GUI 9 based on the calculation results.

Figure 10:
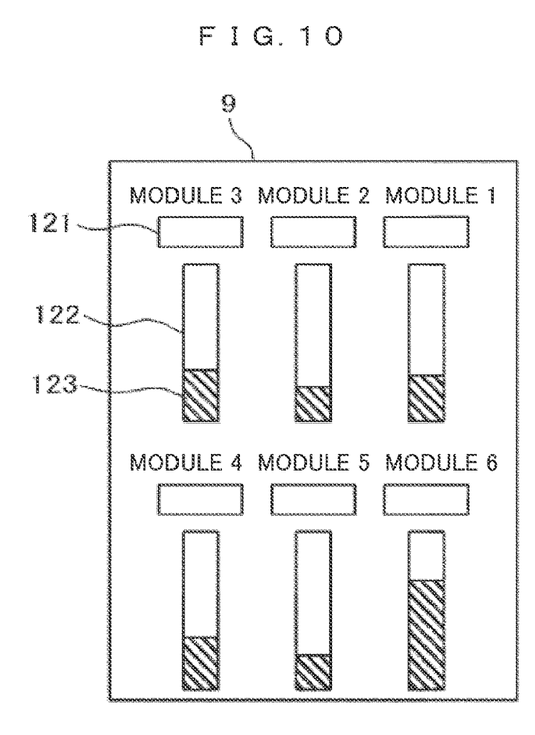
FIG. 10 is a diagram for explaining a GUI in the embodiment.

FIG. 10 shows a specific example of the power conversion device display unit 17. The power conversion device display unit 17 is configured with, for example, a liquid crystal panel, and displays a temperature display unit 121, a life display unit 122, and a damage degree 123 for each power module as shown in FIG. 10. The parameter calculation unit 701 can display an average bonding temperature and a maximum bonding temperature of each power module on the temperature display unit 121 and can display the damage degree 123 on the life display unit 122. The average bonding temperature is an average value of the bonding temperatures of the semiconductor chips 16 constituting the power modules 3. The maximum bonding temperature is a maximum value of the bonding temperatures of the respective semiconductor chips 16 constituting the power modules 3. Of course, the parameter calculation unit 701 may display a minimum value of the bonding temperatures of the respective semiconductor chips 16 constituting the power modules 3 or a median value of the bonding temperatures of the respective semiconductor chips 16.

In addition, an environmental information acquisition unit 18 acquires weather data such as outside temperature and external environmental data including operation data of a transportation such as such as a railway, and the parameter calculation unit 701 can generate a relaxation instruction with the logic unit 704 and output a relaxation control PWM instruction signal with the control unit 703 based on the instruction signal, the bonding temperature, and the damage degree. The environment information acquisition unit 18 includes a calculation device such as a chip having various sensors including a temperature sensor. In addition, the GUI 9 can be included in a vehicle information integration system 21 (FIG. 11). In addition, if included in a central monitoring device 22 (FIG. 11) with a monitor that monitors a state of a vehicle, a plurality of vehicles can be monitored, and maintenance plans can be optimized.

According to the embodiment described in detail above, it is possible to provide a power conversion device that detects a current change rate of the power semiconductors and comparing the current change rate with a reference value, thereby detecting an abnormality or a damage of a power semiconductor and related power conversion devices with high accuracy and preventing failures and other problems with high accuracy, and that can be used for a long time.

Figure 11:
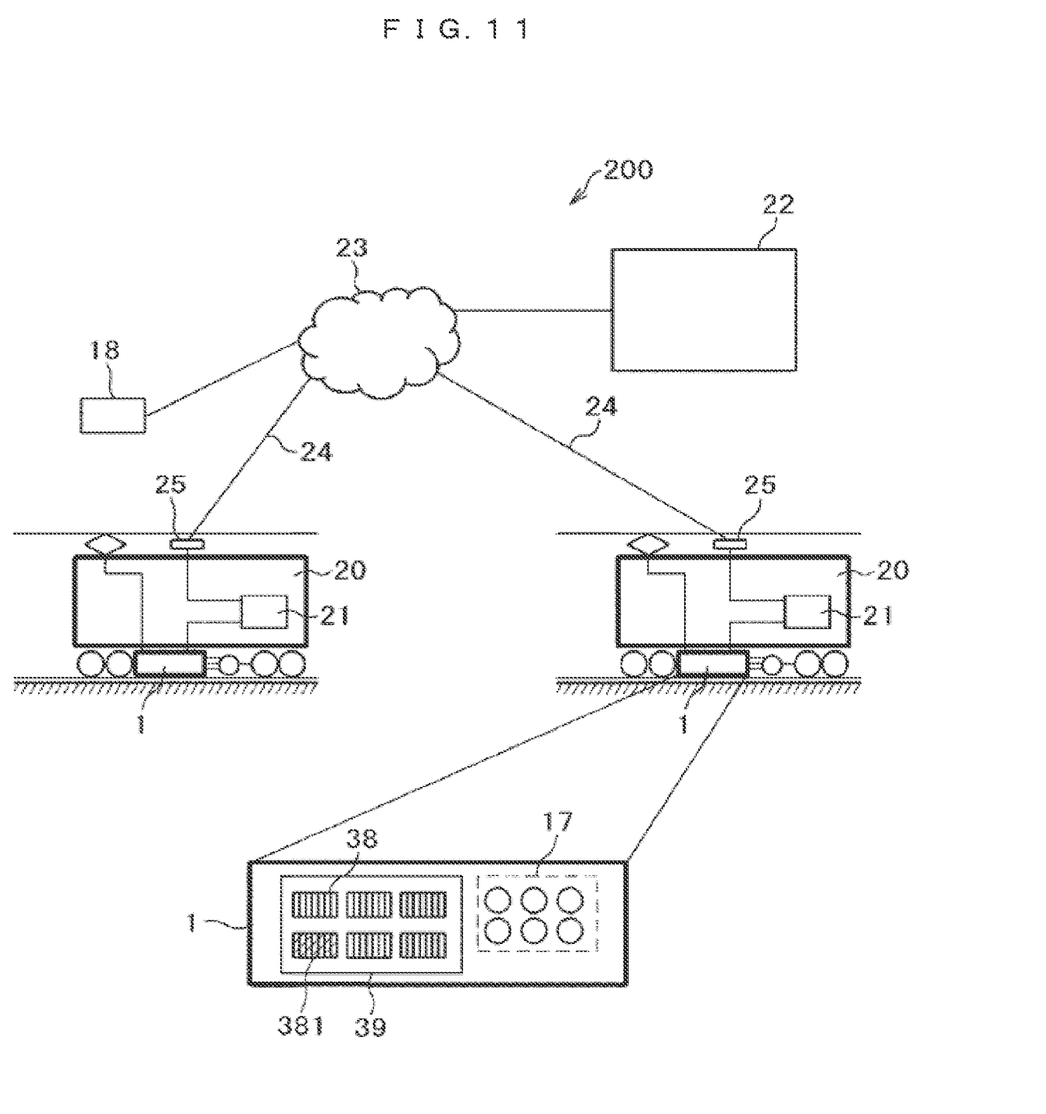
FIG. 11 is a system block diagram when a diagnosis system is applied to a railway.

FIG. 11 is a block diagram of a railway diagnosis system 200 in which the diagnosis system 100 in this embodiment is applied to a railway. As shown in FIG. 11, the railway diagnosis system 200 includes a railway vehicle 20, the vehicle information integration system 21, the central monitoring device 22, the Internet 23, a wireless route 24, and the environment information acquisition unit 18. The railway vehicle 20 includes an antenna 25, the power conversion device 1, and a motor M. In addition, the power conversion device 1 has the power conversion device display unit 17, the cooler 38, and a cooler display unit 39, as shown in a lower part of FIG. 11. The cooler 38 is a device that cools the power module 3, for example, one cooler 38 is provided in each of the power modules. The cooler 38 includes a cooling fin or a fan, and a temperature sensor is provided therein. The power conversion device 1 monitors the temperature sensor and controls the cooler 38 to a proper temperature.

Since the power conversion device display unit 17 is provided on a visible surface of the power conversion device 1 (such as a VVVF inverter) at a lower part of the railway vehicle 20 (on a vehicle side surface in FIG. 11), a temperature display, a life display, and the damage degree as shown in FIG. 10 can be displayed for each of the power modules respectively so that a maintenance worker can be notified. In addition, since the power module indicating the abnormality, such as the temperature display, the life display, or the damage degree exceeding a predetermined threshold, can be recognized and specified in situ, and maintenance work efficiency is improved. In addition to the display relating to the power module, for example, a warning of prompting cleaning of the cooler 38 can be displayed on the cooler display unit 39 on the power conversion device display unit 17.

For example, the power conversion device 1 determines whether or not the temperature sensor provided in the cooler 38 has reached a predetermined temperature; if it is determined that the temperature has reached the predetermined temperature, it is determined that cooling performance is decreased, and as shown in the lower part of FIG. 11, the maintenance worker is notified by turning on or blinking a display on the cooler display unit 39 of the cooler 38 provided corresponding to the power module as in a cooler 381. By displaying with respect to the cooler 38 in this manner, the maintenance worker can recognize and specify the abnormality of the cooler 38 in situ similarly as the power module 3.

As described in FIG. 8, the change of the bonding temperature of the power modules 3 and the change of the temperature of the cooler 38 are related. Accordingly, the maintenance worker can determine that the abnormality of the cooler 38 is associated with the power module 3 when an abnormality is displayed on the cooler display unit 39 and the power conversion device display unit 17. On the other hand, when an abnormality is displayed on the cooler display unit 39 while no abnormality is displayed on the power conversion device display unit 17, the maintenance worker can determine that the abnormality is an abnormality caused by the cooler 38.

In the related art, according to the power conversion device 1, when maintenance such as cleaning is required periodically due to a decrease in cooling capacity during operation, there is no method for identifying whether a performance degradation or malfunction of the power conversion device 1 is caused by a temperature increase due to wear of the power module or due to the cooling system, whereas according to the present embodiment, it is possible to identify which device (the power module 3 or the cooler 38) is the cause of the temperature abnormality.

The vehicle information integration system 21 is a system that monitors an air conditioning, doors, lighting, and the like in the vehicle, and is provided in a driver's seat. In addition, it is also possible to transmit information of the GUI 9 to the central monitoring device 22 via the Internet 23 serving as a network in the wireless path 24 with the antenna 25 of the vehicle. In addition, by acquiring other vehicle information via the Internet 23, a more efficient maintenance plan can be formulated. In addition, maintenance costs can be reduced by improving efficiency of parts arrangement. In addition, by acquiring weather information and passenger information with the environment information acquisition unit 18, it is possible to obtain a suitable vehicle configuration.

In this way, the inventors have found that the response signal delay with respect to the instruction signal of the first drive voltage set value 30a, which is the first set value of the gate voltage waveform upon turn-off, is sensitive to the average temperature of the power module, and on the other hand, the response signal delay with respect to the instruction signal of the second drive voltage set value 30b, which is the second setting value, is sensitive to the temperature unbalance of the semiconductor chips in the power module.

Based on the above findings, the system, as explained so far, includes: the temperature detection unit 702 that calculates the bonding temperature based on the delay time with respect to the instruction signal of the response signal generated using the first drive voltage set value 30*a* and the second drive voltage set value 30*b*, which are two predetermined set values of gate voltage values upon turn-off of the power module; a control system that performs a mitigation operation of providing a limit value of the maximum current value when the switch element of the power conversion device is conducted base on the temperature detection and the temperature unbalance detection result obtained by the temperature detection unit 702; and the GUI9, which is a user interface that warns of the abnormal power module display, the cooling system inspection instruction, and the module life.

I order to measure the delay of the gate voltage waveform, the temperature detection unit 702 includes the comparator 36 that allows a user to determine the first drive voltage set value 30*a* and the second drive voltage set value 30*b* and uses drive voltage set values as reference voltages.

In the present system, the temperature detection unit 702 is integrated with the power conversion device, or connected to the power conversion device by separable connection via any of wired, wireless, and terminal. In addition, the GUI 9 may be integrated with the temperature detection unit 702, or connected to the power conversion device by separable connection via any of wired, wireless, and terminal. In this embodiment, since a degree of freedom of configuration is high, for example, it is possible to diagnose the power conversion device mounted on a train or the like with a remote monitoring system.

In the processing method performed in this system, the time measuring unit 37 detects a first delay time with respect to the instruction signal of the response signal generated by the first drive voltage set value 30*a* of the drive voltage, and detects a second delay time with respect to the instruction signal of the response signal generated by the second drive voltage set value 30*b*; the temperature detection unit 702 detects the temperatures of the power modules 3 calculated based on the first delay time and the temperature unbalance of the power modules 3 calculated based on the second delay time respectively; and the parameter calculation unit 701 determines states of the power semiconductor module and the power conversion device according to the bonding temperature calculated by the temperature detection unit 702 and the response signal.

As a specific configuration, the delay time of the response signal with respect to the instruction signal in a predetermined period is obtained by using a gate drive voltage upon switching-off.

The state of the power conversion device can be diagnosed using the delay time. In addition, it is also possible to control the power conversion device based on the diagnosis result. In addition, it is possible to diagnose whether the abnormality of the power conversion device is caused by the power modules or the cooling system.

The system further includes: a trigger circuit that obtains a reference time of a switching operation; and a delay time calculation circuit that obtains a first time of the response signal generated at the first drive voltage set value 30*a* of the gate drive voltage and a second time of the response signal generated at the second drive voltage set value 30*b*, and that detects numerical data indicating a difference between the first time and the reference time and numerical data indicating a difference between the second time and the reference time. The trigger circuit and the delay time calculation circuit are provided in the time measuring unit 37.

In the system, the time measuring unit 37 sets the reference time of the switching operation when a main current is cut off, measures a delay from the reference time of the first time when the drive voltage is the first drive voltage set value 30*a* as the first delay time when the main current is cut off, and measures a delay from the reference time of the second time when the drive voltage is the second drive voltage set value 30*b* as the second delay time when the main current is cut off. In addition, the first drive voltage set value 30*a* is set smaller than the second drive voltage set value 30*b*.

The system includes the power conversion device that receives a direct current as an input and outputs an alternating current to a load. The device includes: the plurality of power modules; the parameter calculation unit 701 that is a control instruction signal generating unit for instructing the switching operation to the plurality of power modules; and a plurality of control devices respectively corresponding to the plurality of power modules. In addition, each of the plurality of power modules includes a plurality of semiconductor switching elements connected in parallel; the parameter calculation unit 701 generates a control instruction signal of instructing the plurality of semiconductor switching elements to cut off the main current; each of the plurality of control devices includes the temperature detection unit 702 that determines two types of temperatures for each of the plurality of power modules. The temperature detection unit 702 includes: the trigger circuit that sets the reference time based on the control instruction signal; the time measuring unit 37 that measures the delay from the reference time of the first time when the control voltage is the first main voltage set value as the first delay time when the main current is cut off, and that measures the delay from the reference time of the second time when the control voltage is the second control voltage set value is measured as the second delay time when the main current is cut off. The temperature detection unit 702 determines a first temperature based on the first delay time, and determines a second temperature based on the second delay time.

Accordingly, according to the embodiment, it is possible to provide a method in which abnormality or damage of the power semiconductor and the power conversion device associated with the power semiconductor is detected with high accuracy by a simple configuration, and malfunction such as a failure can be prevented with high accuracy, and further, can be set to use for a long period of time. In addition, it is possible to provide a system that acquires the bonding temperature and the remaining life of each of the power semiconductor elements in the power conversion device, feedbacks the measurement result to the motor control to perform a life extension treatment of the power module, and warns of parts replacement without processing the power semiconductor elements. In addition, with a simple configuration, the abnormality and deterioration of the power semiconductor and the related power conversion device and cooling system can be detected with high accuracy, and the detection result can be responded to the mitigation operation, or can be maintained or diagnosed.

Although the embodiment has been described above, the invention is not limited to the embodiments described above, and includes various modifications. For example, it is possible to replace a part of the configuration of one embodiment with configurations of other embodiments, it is also possible to add configurations of other embodiment to the configuration of the above embodiment. In addition, it is possible to add, remove, and replace configurations of other embodiments to, from and with a part of configurations of each of the embodiments.

INDUSTRIAL APPLICABILITY

The invention can be used in a field of maintenance and inspection of various power semiconductors and the like.

REFERENCE SIGN LIST

1: power conversion device
2: motor
3a, 3b, 3c, 3d, 3e, 3f: power module
4a, 4b, 4c, 4d, 4e, 4f: game drive circuit
7: control device
9: GUI
706: instruction response transmission and reception unit
702: temperature detection unit
703: control unit
705: current detection unit
701: parameter calculation unit
704: logic unit
17: power conversion device display unit
18: environmental information acquisition unit
20: railway vehicle
21: vehicle information integration system
22: central monitoring device
25: antenna
121: temperature display unit
122: life display unit 123: damage degree

The invention claimed is:

1. A power conversion device comprising a power semiconductor module including a switching element, wherein the power conversion device comprises:
a gate driver circuit configured to drive the switching element and transmit a response signal upon a switching operation of the switching element;
a control unit device configured to output to the gate driver circuit an instruction signal for switching;
a temperature detection unit configured to calculate a bonding temperature of the switching element based on the response signal to the instruction signal;
a calculation unit configured to determine a state of the power semiconductor module according to the bonding temperature calculated by the temperature detection unit and the response signal; and
the gate driver circuit is configured to generate the response signal based on a voltage between a gate and an emitter and a first drive voltage set value or a second drive voltage set value which is at least a binary switch-off reference voltage upon the switching operation of the switching element.

2. The power conversion device according to claim 1, wherein
the temperature detection unit is configured to calculate a delay amount of the switching element based on the instruction signal and the response signal, so as to calculate the bonding temperature and to detect a temperature unbalance of the power semiconductor module.

3. The power conversion device according to claim 1, wherein
the power conversion device comprises:
a plurality of power semiconductor modules; and
a display unit configured to display states of the plurality of power semiconductor modules determined by the calculation unit for each of the plurality of power semiconductor modules.

4. A motor control system comprising:
a power conversion device including a power semiconductor module including a switching element; and
a motor controlled by the power conversion device, wherein
the power conversion device includes:
a plurality of power semiconductor modules;
a gate driver circuit configured to drive the switching element and transmit a response signal upon a switching operation of the switching element;
a control unit device configured to output to the gate driver circuit an instruction signal for switching;
a temperature detection unit configured to calculate a bonding temperature of the switching element based on the response signal to the instruction signal;
a calculation unit configured to determine states of the power semiconductor modules according to the bonding temperature calculated by the temperature detection unit and the response signal; and
a display unit configured to display states of the plurality of power semiconductor modules determined by the calculation unit for each of the plurality of power semiconductor modules.

5. The motor control system according to claim 4, comprising:
a central monitoring device connected to the motor control system via a network, wherein
information indicating the states of the plurality of power semiconductor modules determined by the calculation unit is to be transmitted to the central monitoring device via the network, and to be displayed on a monitor of the central monitoring device.

6. A diagnosis method for a power conversion device including a power semiconductor module including a switching element, the diagnosis method for a power conversion device comprising:
outputting an instruction signal for driving the switching element;
calculating a bonding temperature of the switching element based on a response signal upon a switching operation of the switching element;
determining an abnormality of the power semiconductor module according to the calculated bonding temperature and the instruction signal;
generating the response signal based on a voltage between a gate and an emitter and a first drive voltage set value or a second drive voltage set value which is a switch-off reference voltage upon the switching operation of the switching element; and
calculating a delay amount of the switching element based on the instruction signal and the response signal, so as to calculate the bonding temperature based on the delay amount.

7. The diagnosis method for a power conversion device according to claim 6, the diagnosis method for a power conversion device comprising:
converting time series data of the bonding temperature to a temperature amplitude frequency; and
determining an abnormality of the power conversion device based on the temperature amplitude frequency using a predetermined number of cycles as a reference value.

* * * * *